United States Patent Office 2,815,260
Patented Dec. 3, 1957

2,815,260
PROCESS FOR ELIMINATING URINE ODORS IN TEXTILE MATERIALS BY APPLYING LITHIUM CARBONATE

Leonard W. Melander, St. Paul, Minn., assignor of one-half to Ikel C. Benson, St. Paul, Minn.

No Drawing. Application March 2, 1953, Serial No. 339,893

4 Claims. (Cl. 8—137)

This invention relates to a composition and a process for quickly eliminating odors in absorbent materials, such as diapers, bedding, rugs, or any materials retaining urine odors caused by absorption of or contact with liquid urinary excreta (urine or excreta containing urine) from humans and animals.

In washing and cleansing diapers, it is a comon practice to precede the washing procedure by soaking for several hours in a solution containing some chemical such as lysol, borax or other proprietary formulations. Then in many processes the entire mixture is boiled, then wrung out, then rinsed in clean water, then washed, rinsed again and dried. This process requires considerable time, energy and expense; and still some of the odor-forming residue remains within the diapers or other absorbent materials. Further, when using ordinary soap or other solutions or emulsions now obtainable on the market, the odor-forming residues remain within the diapers and accumulates within the same so that finally drastic treatments are necessary.

One object of the present invention is to devise a pre-washing composition or solution which quickly and easily eliminates odors of liquid urinary excreta.

Another object is to devise a composition or solution which requires no boiling and only one rinse for eliminating odors of liquid urinary excreta.

Another object is to devise a composition or solution which leaves no irritating residue in the treated materials that may be harmful even to the tender skin of an infant.

Another object is to provide a simple process for quickly and easily eliminating odors of liquid urinary excreta.

Another object is to provide a process for eliminating odors of liquid urinary excreta without boiling and with only one rinse in clean, cool water.

Other objects will become apparent from the following description:

Composition.—48.5 grams or 1.9 tablespoons of lithium carbonate, $Li_2CO_3$, having a specific gravity of 2.11 into each gallon of cool water from 10 to 25° centigrade. By stirring, a cool saturated solution of lithium carbonate is formed almost immediately. I have found that lesser amounts of lithium carbonate down to 5 grams or 0.2 tablespoon of lithium carbonate in each gallon of cool water also provides a satisfactory composition, even though the resulting solution is not saturated.

Process.—Soak the odoriferous materials that contain the odor of liquid urinary excreta in the above composition for one to three minutes, stir the mixture for approximately half a minute, wring out the composition, rinse in clean cool water, wring out the water, then wash and dry the materials. All urinary odors have passed from the materials into the lithium carbonate solution leaving the materials in a pleasing, non-odorous condition. This deodorization is practically instantaneous, since the urinary odors are absorbed into the lithium carbonate solution. Since lithium carbonate is more soluble in cold water than in hot water, a cold water solution is preferable. This process eliminates the need for overnight soaking and boiling of the mixture.

While I have described in detail the preferred composition and the preferred practice of my process, it is to be understood that my invention is not restricted thereto except as set forth in the appended claims.

Having described the invention, what is claimed as new and desired to be protected by Letters Patent is:

1. The deodorizing process of soaking odoriferous textile materials that contain the odor of liquid urinary excreta in a lithium carbonate solution having 5 to 48.5 grams of lithium carbonate in each gallon of water for at least one minute, stirring the mixture for at least 20 seconds, wringing out the excess solution, rinsing the materials in clean cool water which materials have now become non-odorous, and wringing out the excess water, whereby odor-forming residues are eliminated from the said textile materials.

2. The method of deodorizing or treating textile goods containing liquid urinary excreta, which method consists in, first, soaking the said goods for at least one minute in a solution containing at least 5 grams lithium carbonate in each gallon of water having a temperature between 10 and 25 degrees centigrade; second, stirring the goods for at least 20 seconds in the said solution; third, physically separating the soiled solution from the goods; fourth, rinsing the goods for at least one-half minute in clean water having a temperature between 10 and 25 degrees centigrade; and fifth, physically separating the soiled water from the goods which now become free from the objectionable odors of liquid urinary excreta.

3. The method of deodorizing textile goods containing odoriferous liquid urinary excreta preparatory to the regular laundering process, which method consists in, first, soaking the said goods for one to three minutes in a solution containing approximately 48 grams of lithium carbonate in each gallon of water having a temperature between 10 and 25 degrees centigrade; second, stirring the goods for approximately one-half minute in the said solution; third, physically separating the soiled solution from the goods; fourth, rinsing the goods for approximately one-half minute in clean cool water; and fifth, physically separating the soiled solution from the goods whereby the odor-causing elements of the liquid urinary excreta are eliminated from the said goods.

4. The method of deodorizing or treating textile goods containing liquid urinary excreta which method consists in, first, soaking the said goods for one minute in a solution containing at least 5 to 48.5 grams lithium carbonate in each gallon of water; second, stirring the goods for at least 20 seconds in the said solution; third, wringing the soiled solution from the goods; fourth, rinsing the goods for at least one-half minute in clean water; and fifth, wringing the soiled water from the goods which now become free from the objectionable odors of liquid urinary excreta.

References Cited in the file of this patent

UNITED STATES PATENTS

| | | |
|---|---|---|
| 53,646 | Meany | Apr. 3, 1866 |
| 1,435,332 | Phair | Nov. 14, 1922 |
| 1,777,857 | Phair | Oct. 7, 1930 |

OTHER REFERENCES

Seidell: "Solubilities of Inorganic Compounds," D. Van Nostrand Co., N. Y., 1919, 2d ed., page 368.

Matthews, J. Merritt: Bleaching and Related Processes, 1921, p. 565. (Copy in Patent Office Library and Div. 43.)

Stain Removal from Fabrics, U. S. Dept. of Agriculture Farmers' Bulletin No. 1474, September 1942, page 28.